Oct. 13, 1970

A. HELLER 3,534,287

LIQUID LASER ACTIVE MEDIUM

Filed Dec. 23, 1966

INVENTOR.
ADAM HELLER

BY R. J. Frank
ATTORNEY.

United States Patent Office 3,534,287
Patented Oct. 13, 1970

3,534,287
LIQUID LASER ACTIVE MEDIUM
Adam Heller, Bayside, N.Y., assignor to General Telephone & Electronics Laboratories Incorporated, a corporation of Delaware
Filed Dec. 23, 1966, Ser. No. 604,362
Int. Cl. H01s 3/20; C09k 1/04, 1/08
U.S. Cl. 331—94.5     8 Claims

ABSTRACT OF THE DISCLOSURE

An active medium for a liquid laser comprising a solution of a polar compound containing an ion selected from the group consisting of ions of chromium, manganese, molybdenum, holmium, dysprosium, praseodymium, neodymium, europium, samarium, terbium, erbium, ytterbium, thulium and uranium. The compound is dissolved in a solvent consisting essentially of heavy atoms and having the property that the energy of stretching vibration between the immediate and second neighbor of the ion in the resulting complex is at least as small as one-half the difference in energy between the luminescent level of the ion and the highest level of its ground state multiplet. A Lewis acid is added to enhance the solubility of the polar compound in the solvent. In a typical solution, the polar compound is neodymium oxide, the solvent is selenium oxychloride and the Lewis acid is tin tetrachloride.

---

This invention relates to lasers and in particular to a laser in which the active medium is a liquid characterized by a low threshold for the initiation of laser action.

The term "laser" is an acronym for "light amplification by simulated emission of radiation." The light which is amplified includes not only the visible portion of the frequency spectrum but also the infrared and ultraviolet bands and resides within an approximate wavelength band of from $10^3$ to $10^6$ angstroms.

The operation of the laser depends on the interaction of radiation with matter which occurs when matter (i.e. atoms or molecules) either absorbs or emits photons. Usually, atoms and molecules exist in a stable non-radiating or ground state in which energy is not emitted. This state corresponds to a fixed quantity or level of internal energy. When an atom is in the ground state and interacts with an incident photon, the atom or molecule can absorb the energy of the photon and be placed in a higher or "excited" state, provided that the energy of the photon is at least equal to the difference in energy of the ground and excited states. Similarly, when the energy level of an atom or molecule is suddenly changed from one state to a lower energy state, a photon of radiation may be produced. The energy of this photon will be equal to the difference in energy between these states.

An atom in an excited state can emit a photon spontaneously and revert to its ground state or some intermediate state. However, during the period in which the atom is still excited, it can be stimulated to emit a photon by interacting with an incident photon if the energy of this incident photon is substantially equal to that of a photon which would otherwise be emitted spontaneously. As a result, the incoming photon or wave is augmented by the one given up by the excited atom. This released wave falls in phase with the wave that triggered its release. Hence, an amplifying action ensues. This phenomenon is known as stimulated emission.

Under ordinary conditions, there are more atoms in the lower energy states than in the higher energy states. In the laser, the distribution of electrons among the energy levels is changed by a process of "pumping" so that there will be more atoms in the higher than in the lower states. The incident photons of the lowest energy can produce more downward than upward transitions and stimulated emission can be produced. This process of "pumping" consists of injecting energy into the assemblage of atoms whereupon the atoms absorb energy and are raised into excited states. The injected energy per unit time must exceed a threshold value determined primarily by the characteristics of the active medium in order to result in stimulated radiation.

In the laser, a suitable active medium is normally enclosed in a cavity resonator. A wave that starts at any position between ends of the resonator will travel toward one end with increasing amplitude. When it reaches the end, the wave is reflected back toward the starting point which results in a further increase in amplitude. The gain in energy of the wave during repeated passages is reduced by losses at the reflecting surfaces and elsewhere. However, the repeated reflection and accompanying reinforcement of the resonant cavity operation result in the generation of an output wave of readily detectable increasing intensity. Each time the wave is reflected at one end, a portion of the wave passes through this end. The wave is continually reinforced because of repeated reflections and, thus reinforced, constitutes the laser output wave.

The output of the laser is highly directional since the waves which are emitted must make many repeated passages without significantly deviating from a path parallel to the axis of the resonator. (If a wave is inclined at an angle with respect to this path, it will leave the resonator after few if any repeated reflections and normally will not have the opportunity to grow appreciably in amplitude.) At low input power levels, the emitted radiation is substantially monochromatic (i.e. essentially a single frequency) since stimulated emission takes place most strongly at frequencies in the middle of the band of frequencies emitted by spontaneous radiation. However, as the input power levels are increased, additional emission lines are normally observed in most solid active media. The additional lines are each essentially monochromatic and are produced by the different crystal fields (i.e. electric field due to the atoms surrounding the active atom) influencing the active atom. In single crystal media, the locations or sites of the active atoms are defined by the lattice structure and the number of locations having different crystal fields is small. These locations are fixed except for vibrations of the lattice. For glass media, the number of locations having different fields is extremely large due to the absence of an ordered lattice structure. The locations in glass media are also fixed since the atoms lack the freedom to translate and rotate which is inherent in liquid media. In glass and most single-crystal media, the different crystal fields of the active atoms result in a number of emission lines and a corresponding decrease in the efficiency of generation of a particular line.

Considerable interest in active laser media has resulted from the initial investigations of laser phenomena and the generation of stimulated emission has been found to occur in many solids and gases. However when laser action is based on atoms embedded in a crystalline lattice only single crystals free from imperfections can serve as solid laser materials. This is due to the fact that crystal imperfections cause scattering which impairs and, in some cases, destroys the coherent amplification. As a result, crystal media must be extremely carefully prepared. The difficulties present in the growth of single crystal media have limited the size, and therefore the output power, of this type of medium.

Active liquid media eliminate the problems of single-crystal growth and shaping, and are relatively easy to prepare in large volumes. Also, the working fluid may be circulated thereby providing a solution to the difficult problem of cooling the medium. The inability to cool the central region of solid media places a limitation on the level of the input power which may be supplied to a particular medium. Other advantages obtained through the use of liquid media are an immunity of the media shatter or cracking under thermal or mechanical stress and an ability to provide self-repair. The self-repair feature of liquid systems eliminates the burning holes in the medium due to the high power of the narrow emitted beams.

One type of liquid laser known to have been tested and operated employs a chelate-type of metallo-organic compound. In the chelate lasers, a central active ion is held in a cage-like structure by a number of organic ligands. One such liquid laser is described in U.S. Pat 3,454,901, granted July 8, 1969 to C. Brecher, A. Lempicki and H. Samelson and assigned to the same assignee as the present application.

In the chelate liquid laser, stimulated emission is obtained by the following described mechanisms. When light of the proper wavelength is incident upon a solution of the chelate metal ion in an appropriate solvent, energy is absorbed by the chelating complex and a transition occurs with the chelating ring rising from its ground state to a higher singlet level. The chelating complex then relaxes to an intermediate state between the ground and singlet states following which there is a transfer of energy to the chelated active ion. Subsequently, there is a decay of the chelated ion to an energy level somewhat above the ground state level resulting in the stimulated emission of radiation.

Although laser action takes place in this active liquid medium at room temperatures, the performance of this medium has been found to be limited by the intense absorption of energy in the pump band of frequencies by the chelating complex. While intense absorption is characteristic of a high power output per unit volume of active material, the intense absorption of chelate species prevents the incident radiation from penetrating substantially beyond the surface of the active medium. As a result, the stimulated emission takes place in only a small portion of the active medium and the energy output of such a laser is less than that obtained from crystal and glass media. Increasing the volume of the active medium has been found to provide little increase in the total energy output.

Further, the chelate-type liquid laser medium is characterized by a relatively high power threshold. This threshold may be thought of in terms of the power density necessary to produce stimulated emission of radiation and is typically specified for a given laser structure by the energy in joules of a pulse of recited duration. Neglecting the losses inherent in the particular laser structure, the power threshold is a function of the absorption spectrum, the concentration of active ions, and the quantum yield of fluorescence of the active medium. In chelate active media, the pump energy is absorbed in the broad singlet absorption bands of the chelating agent. The absorption constant in the excitation or pump region is extremely high at the frequency corresponding to peak absorption. As a result, the incident energy at this frequency is absorbed by only those molecules proximate to the surface of the medium. Consequently, chelate liquid lasers are characterized by small active volumes and low output energy and power.

The quantum yield of fluorescence of many luminescent ions is relatively low at room temperatures and increases the power threshold for stimulated emission. This low quantum yield is due primarily to rapid radiationless relaxations of the active ions in solution. These relaxations result in part from the high energy vibrations of bonds involving light atoms, particularly hydrogen. The energy of stretching vibration between two atoms is a function of the inverse of the product of their masses. When this vibrational energy is of the order of magnitude of the energy gap between the metastable or luminescent level of an atom, ion or molecule, and the highest level of its ground state multiplet, the excess energy may be lost by the excited atom. This loss of energy results in a radiationless relaxation. In addition, certain rare earth ions, for example, neodymium, undergo "concentration quenching" in which the ions themselves may interact with each other in a manner inducing radiationless relaxations. This interaction between ions is in part a function of the distance therebetween and is found to contribute to the degrading of the quantum yield of fluorescence.

Accordingly, it is an object of the present invention to provide an active medium for a liquid laser in which the threshold at which stimulated emission is obtained is as low as that of known single crystal active media.

Another object is to provide a liquid laser wherein the emitted power and energy exceed that of known liquid lasers.

An additional object is to provide a liquid active medium in which the intense absorbance heretofore characteristic of liquid media is substantially eliminated.

A further object is the provision of an active medium for a liquid laser in which the exciting radiation is absorbed directly by the ions in the medium.

Another object is the provision of an active medium for a liquid laser in which radiationless relaxation of the active ion are minimized.

Still another object is to provide a laser which is relatively easy to manufacture and relatively low in cost.

In accordance with the present invention, a laser is provided in which a cavity is filled with a solution of a compound containing an active agent, a solvent capable of dissolving the compound and a Lewis acid for enhancing the solubility of the compound.

The active agent of the present medium is characterized by having at least one excited state or lumniescent level to which it may be raised by the absorption of energy. In addition, the molar absorbance of the active agent must be within the range of 0.01 to 1000 cm.$^{-1}$ lit mol.$^{-1}$ to insure that energy is absorbed throughout the volume of the solution. If the molar absorbance of the active agent exceeds this range, only a few molecules of the active agent located proximate to the surface of the medium absorb substantially all of the energy. When the molar absorbance of an active agent is less than 0.01 cm.$^{-1}$ lit mol.$^{-1}$, the probability of any molecules of the active agent absorbing energy and being raised to their excited level is low and the medium is generally unsuitable for use in a laser. Typical active agents having the required properties are metals selected from the following group; chromium, manganese, molybdenum, holmium, dysprosium, praseodymium, neodymium, europium, samarium, terbium, erbium, ytterbium, thulium, and uranium. More than one of the active agents may be used in applications wherein the absorption band of one is utilized and energy is transferred from a first agent to a second agent. This type of active medium is generally referred to as a "sensitized" medium.

The compound containing the active agent is generally a polar compound which dissociates in solution to form cations and anions. The active agent may be contained in either the cation or anion. In solution, an active ion is solvated forming a molecular or ionic complex wherein the ion is surrounded by a zone of oriented donor molecules, normally solvent molecules. The complex formed by the solvation of the active ion may be considered as spherical with the active ion in a central position within the sphere.

In the complex, the active ion is bound by coordinate bonds to the surrounding solvent molecules. The coordinate bond is formed by the sharing of a pair of electrons between the active ion and an atom of the solvent molecule. The atom of the solvent molecule forming the coordinate bond is referred to herein as the immediate neighbor atom. This atom is bound to at least one other atom in the solvent molecule. An atom bound to the immediate neighbor is referred to herein as the second neighbor atom.

The number of solvent molecules surrounding an individual active ion and forming the coordination complex is determined by the active ion itself favoring a particular number of immediate neighbors. For example, neodymium forms coordinate bonds with 8 to 10 immediate neighbor atoms. As mentioned, the individual solvent molecules forming this complex are oriented with the immediate neighbor atom of each molecule forming a coordinate bond, i.e. sharing an electron pair, with the active ion. In the case of an active cation, such as a rare earth ion, the immediate neighbor atom of the solvent is required to have an unshared electron pair. Typical elements containing unshared electron pairs are nitrogen, oxygen, fluorine and the like.

The orientation of the solvent molecules in a particular complex normally remains the same for other complexes containing different active ions. Thus, the identity of the immediate and second neighbor atoms of a particular solvent molecule is unchanged for solutions containing other active ions. The identity of the immediate neighbor atom of a solvent molecule can be determined by measuring the frequency of the vibrations of the atoms comprising the solvent molecule before and after the addition of the compound. In practice, these frequencies are determined by the use of an infrared spectrometer. The interaction between the compound and the solvent results in detectable changes of the frequency of the vibrations. The atom of the solvent molecule undergoing the most significant frequency change in its vibrations is the atom forming the coordinate bond and referred to herein as the immediate neighbor atom.

The solvent employed in the present liquid medium may be characterized in two ways; first, it must possess a relatively high dielectric constant so that the forces between the cation and anion of the polar compound are reduced thereby preventing precipitation and, second, the energy of the stretching vibration between the immediate and second neighbor atoms of the oriented solvent molecule must be at least as small as one-half of the energy difference between the luminescent level and the highest level of the ground state multiplet of the active agent.

In reference to the second characteristic, atoms bound together have an energy of stretching vibration which is a function of the inverse of the product of their masses. Thus, bonds involving light atoms such as hydrogen and deuterium have a relatively high energy of vibration. Also, the radiation producing relaxation of the excited active agent from its luminescent (i.e. metastable) level to a level within its ground state multiplet is characterized by the energy difference therebetween. As the energy of stretching vibration approaches the energy difference between the ground state and the excited state multiplets, rapid radiationless relaxations of the active agent occur which are due to the acceptence by the solvent molecules of this energy. Due to the predominance of these radiationless relaxations, active agents widely used in crystal and glass active laser media, such as neodymium, have been unsuitable for use in liquid active media.

However, it has been found that by utlizing solvents containing heavy atoms (i.e. atoms heavier than hydrogen or deuterium) so that their energy of stretching vibrations does not exceed one-half the difference in energy between the luminescent level and the highest level of its ground state multiplet, no vibrations of sufficient energy are present in the active medium to accept, even upon undergoing transitions to reasonably high vibrational states, the energy difference relied on for stimulated emission. As a result, radiationless relaxations are substantially eliminated from the medium and its quantum yield of luminescence is substantially improved.

Referring to the polar compound as AB, when the compound is added to the solvent dissociation into the corresponding anions B⁻ and cations A⁺ takes place. In this example, the cation is the active ion while the anion is the non-metal ion, typically oxygen, chlorine and the like. The solvent, designated as CD, undergoes dissociation in part forming anions D⁻ and cations C⁺. The solubility of the polar compounds determines the concentration of active ions A⁺ in the medium. The threshold for stimulated emission of a medium is a function of the active ion concentration. Therefore, it is important to insure that substantial amounts of the polar compound are dissolved.

By adding a Lewis acid, designated as E, to the solvent, a reaction between the solvent CD and the acid additive E occurs producing a nonaqueous acid in which the solubility of the active ion is enhanced. A Lewis acid, as defined in the art and as used herein, is a substance which can accept an electron pair from a base. The addition of a Lewis acid to a solvent gives rise to a cation which is characteristic of the solvent. The reaction between the solvent and the Lewis acid is expressed in general terms as follows, $n$ being the number of solvent anions with which the Lewis acid combines:

$$CD \rightleftarrows C^+ + D^-$$

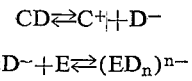

The Lewis acid E combines with the solvent anion D⁻ and thereby promotes the dissociation of the solvent molecule CD since the product of the solvent ion concentration $(C)^+(D)^-$ is reduced by the removal of anions D⁻. As a result, the number of solvent cations C⁺ in the solution increases. The solvent cations combine with the polar compound anions which in a similar manner permits the concentration of the polar compound cations to increase without reaching the saturation point of the solution. The polar compound cations A⁺ are the active ions and increasing the concentration thereof decreases the threshold of the laser medium.

The present active media have been found to exhibit the low energy thresholds and high gains heretofore obtainable only with single crystal laser media. Furthermore, the gain of a laser employing the present medium, i.e. the ability of the laser to amplify light at the frequency of the stimulated emission as it passes through the medium, is sufficiently high to permit operation without the use of reflecting surfaces.

The afore-mentioned features and advantages will become more readily apparent from the following detailed description of a specific embodiment when taken in conjunction with the accompanying drawings, in which.

Figure 1:
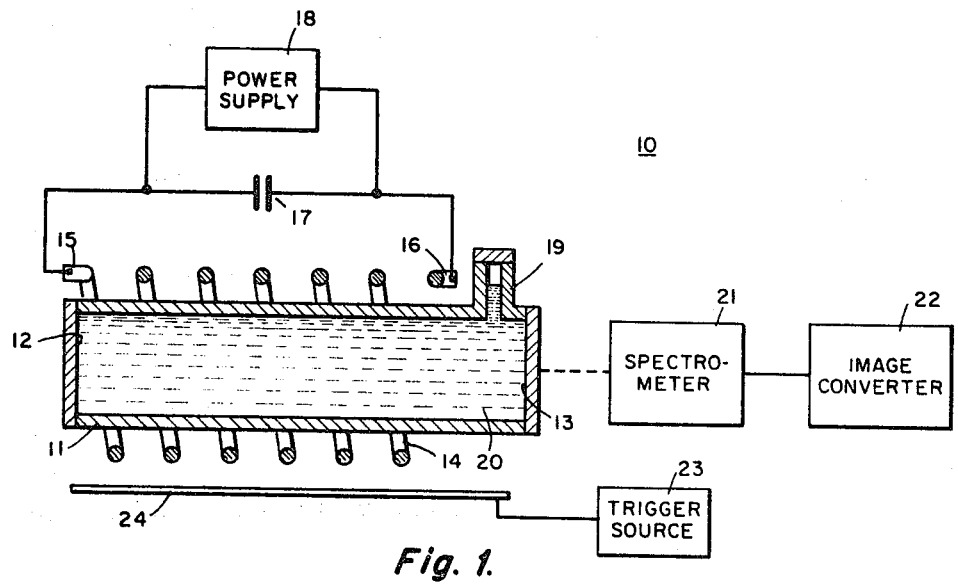
FIG. 1 is a schematic representation of a liquid laser.

Referring to FIG. 1, there is shown schematically a laser 10 comprising a hollow transparent cylinder 11 which may be made of any material which transmits light in the pumping region, such as quartz, Pyrex, and the like. In practice, the cylinder 11 may be formed of commercial glass tubing. First and second optically flat end seals 12 and 13 are fused to the ends of the cylinder. These endseals may be either transparent to the radiation emitted by the laser or provided with reflecting coatings depending on the desired application. Typical cylinders have bore diameters of 2 to 10 mm. and lengths ranging between 2 and 12 inches.

The end-sealed cylinder is filled with the active liquid medium through side-arm 19 which is then sealed. If the medium is to be circulated a second side-arm may be provided and the side-arms used as input and output ports. A flash lamp 14 is placed around the cylinder. Electrodes 15 and 16 are connected to the ends of the helical flash tube. A capacitor 17 is coupled between the electrodes. Power supply 18 maintains a constant voltage of about 10 kilovolts across capacitor 17. The structure is maintained at room temperature.

When the lamp is flashed by applying a 20 kilovolt trigger pulse to wire 24 from trigger source 23, energy is absorbed by the active medium and the stimulated emission is obtained through the end-seals 12 and 13. Alternatively, one or both of the end-seals may be reflecting and the output obtained from only one end of the laser. The wavelength of the stimulated emission is primarily determined by the active ion in the liquid medium.

The active medium 20 is a solution of a polar compound in which the cation is the active ion, a solvent having a high dielectric constant and a characteristic maximum energy of stretching vibration, and a Lewis acid. The polar compound is a salt containing an active agent characterized by having at least one excited state or luminescent level to which it may be raised by the absorption energy. Also, the active agent is required to have a molar absorbance within the range of 0.01 to 1000 cm.$^{-1}$ lit mol$^{-1}$ for the effective absorption of the pumping energy. Preferred active agents are selected to be at least one of the following metals: chromium, manganese, molybdenum, praseodymium, neodymium, dysprosium, holmium, samarium, terbium, erbium, thulium, europium, ytterbium and uranium.

The use of more than one of these metals, for example chromium and neodymium, is referred to as sensitized emission wherein one active ion absorbs the exciting radiation and transfers it to the other active ion which undergoes radiation-emitting transitions. Sensitized emission combines the energy absorbing qualities of one active ion with the energy emitting properties of the second ion. The effectiveness of sensitized emission is a function of the relative locations of the first and second ions. The continually varying locations of ions in liquid media render them more suitable for sensitized emission than solid media wherein the locations are essentially fixed.

The polar compound may be any suitable salt containing the active agent. Oxides and chlorides of the active agent have been generally preferred due to the relative ease with which they may be prepared. The polar compound is added to the combination of a solvent and a Lewis acid. Since polar compounds are generally characterized by low solubility products in solvents having low dielectric constants, the present solvent is required to have a relatively high dielectric constant so that the compounds dissolve therein. The dielectric constant for the solvent of the present media is required to exceed 20. The use of solvents having lower dielectric constants has been found to result in the precipitation of the polar compound.

Figure 5:
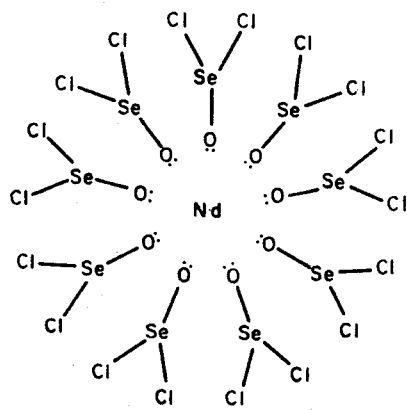
FIG. 5 is a representation of the complex formed by the active agent and the solvent molecule of one embodiment of the invention.
Figure 6:
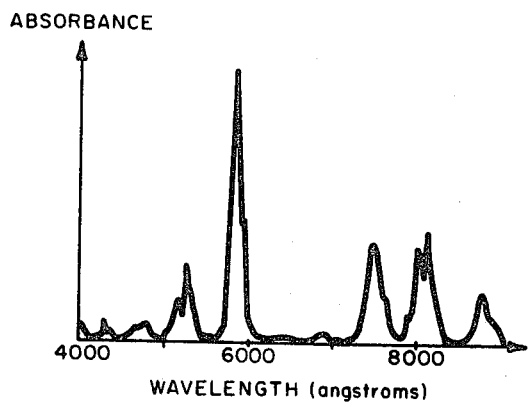
FIGS. 6 and 7 show the idealized spectral distribution of absorbance and emission for the active liquid medium shown in FIG. 5.

When the polar compound dissociates into cations and anions, the active agent is the cation which forms a complex with the solvent. In other words, the cation is solvated by a surrounding zone of oriented solvent ions. The complex formed by the solvated cation is determined by the number of immediate neighbors the cation favors. In the case of a neodymium cation, the complex contains 8, 9, or 10 immediate neighbors. The complex formed in an active medium containing neodymium cations solvated by SeOCl$_2$ is shown in FIG. 5. The immediate neighbor atom, in this case oxygen, forms a coordinate bond with the cation. The immediate neighbor shares a pair of electrons with the cation. The second neighbor atom, selenium, is bound to the immediate neighbor. This orientation of the solvent molecule is independent of the cation. However, the number of molecules forming the complex is determined by the cation.

The solvent in the present media is characterized by the fact that it has an energy of stretching vibration between the immediate and second neighbors of the solvated active ion which is at least as small as one-half the difference in energy between the luminescent level of the ion and the highest level of its ground state multiplet. As known, the energy of stretching vibration between two atoms is a function of the inverse of the product of their masses. Thus, setting a maximum limit on the energy of vibration sets, in effect, a limit on the weight of the atoms forming the solvent. Expressed differently, the solvent must contain heavy atoms in the immediate and second neighbor positions relative to the active ion. The weight of these atoms is determined by the active ion employed. In media employing praseodymium, neodymium, dysprosium, holmium, erbium, ytterbium, thulium or uranium, the solvent cannot contain atoms lighter than lithium in the recited locations.

It shall be noted that chromium, manganese and molybdenum have relatively large energy gaps between the excited and ground states so that the ions thereof may be solvated by hydrogen atoms. In practice, these three ions are normally employed as sensitizers and are used in combination with one of the other recited ions. The active ion in the solution which has the smallest energy gap determines the required composition of the solvent.

The inorganic solvents SeOCl$_2$, SeOBr$_2$, SbBr$_3$, and SbCl$_3$ are examples of solvents possessing the required high dielectric constant and containing only relatively heavy atoms. The extremely high dielectric constant (approximately 46 at room temperature) of selenium oxychloride SeOCl$_2$ and its relatively low highest energy of vibration (955 cm.$^{-1}$), render this solvent particularly well suited for use in a liquid active medium. For example, the smallest possible energy gap between the $^4F_{3/2}$ and $^4I_{15/2}$ levels of neodymium is 5500 cm.$^{-1}$ so that radiationless relaxations of neodymium in this medium are essentially eliminated. While it is advantageous to employ active media which are liquid at room temperatures, solutions having melting points above room temperatures may be utilized in particular applications by heating the laser structure so that the medium has the desired viscosity.

However, even with the use of a high dielectric constant solvent, the concentration of the polar compound in the solvent is limited. Since the energy threshold of an active medium is a function of the active ion concentration, it has been found necessary to add a Lewis acid to the solvent to increase the amount of the polar compound going into solution. A Lewis acid is defined as a substance which can accept an electron pair from a base. When added to the solvent, the Lewis acid combines with the anion of the solvent, typically a halogen ion. The acid enhances the solubility of the polar compound in the solvent by combining with and, in effect, removing solvent anions from the solution. This provides additional solvent cations in accordance with the solubility product of the solvent.

In addition, the combination of the Lewis acid and the solvent anion form an ion which is relatively large compared to that of the solvent anion. Thus, the possibility of the solvent anion itself forming a complex with the active ion is reduced. The solvent cations combine with the polar compound anions to introduce the polar compound cations, i.e. the active ions, into the solution. Thus, increasing the concentration of solvent cations results in an increase of active ions in solution and a lowering of the energy threshold of the active medium. The active ions are complexed or solvated in the solution. However, the complexed ions are relatively large in size and "concentration" or "self" quenching of the active medium has not been observed in the cited examples at high ion concentrations. The following examples illustrate the afore-mentioned reactions which introduce the active ions into solution.

EXAMPLE 1

1000 grams of anhydrous SnCl$_4$ was diluted to two liters by the gradual addition of vacuum distilled SeOCl$_2$. The exothermic reaction, excluding solvent participation, is $$2SeOCl_2 + SnCl_4 \rightleftharpoons 2SeOCl^+ + SnCl_6^{2-}$$

Then 168 grams of neodymium oxide, Nd$_2$O$_3$, was added to the mixture. The solution was brought to a boil at a temperature of 110° C., and a small amount of SnCl$_4$ (about 10% of the total) was distilled off to remove any traces of water. Then the solution was cooled to room temperature over a period of 12 hours.

The reaction introducing the active ions into the solution is $$Nd_2O_3 + 3SeOCl^+ + 3SeOCl_2 \rightleftharpoons 2Nd^{3+} + 3SeOCl_2 + 3SeO_2$$

The active medium was prepared in a water-free environment. The active ion concentration was 0.5 N.

Figure 2:
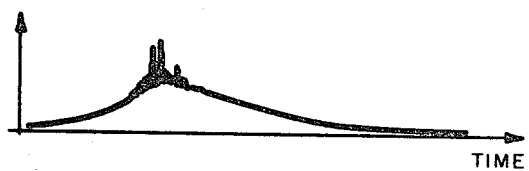
FIGS. 2 through 4 are idealized drawings of oscillograms illustrating the output intensity of the liquid laser of FIG. 1.
Figure 3:
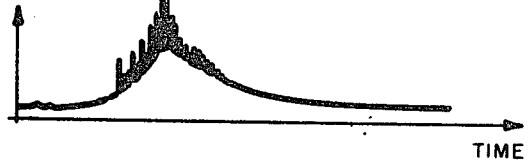
Figure 4:
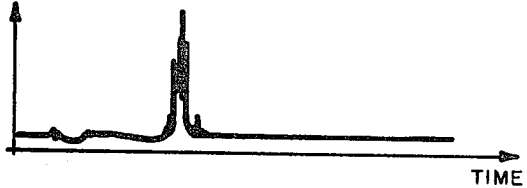

The performance characteristics of the laser structure of FIG. 1 employing the active medium of Example 1 at room temperature are shown in FIGS. 2, 3, and 4. As shown in FIG. 1, the output of the laser was directed into a 1—$m$ Czerny-Turner, Jarrel-Ash spectrometer 21. An RCA 6914 image converter (S–1 photosurface) 22 was placed at the output of the spectrometer so that a 150 angstrom portion of the spectrum could be readily photographed. The fluorescence traces of FIGS. 2, 3, and 4 shows the energy output of the laser for the 150 angstrom portion of the spectrum centered about 10,560 angstroms. This wavelength corresponds to the energy gap between the $^4F_{3/2} \rightarrow {}^4I_{11/2}$ transition of neodymium.

The traces of FIGS. 2 and 3 were obtained for a laser cell having a 4 inch length and no reflecting surfaces. The flash tube was a type FT524 and provided, for the results shown in FIG. 2, an input energy of 37 joules in a 100$\mu$ second pulse. The occurrence of spikes is characteristic of the simulated emission of radiation. At the higher energy of 150 joules, shown in FIG. 3, a large burst of spikes was obtained. In addition, the spectral line of the emitted radiation narrowed to less than 10 angstroms.

The trace of FIG. 4 was obtained from the laser of FIG. 1 employing a totally reflecting end-seal 12 and a 95% reflecting end-seal 13 for an input energy of 150 joules in a 100$\mu$ second pulse. The trace of FIG. 4 is reduced 50 times in amplitude as compared to the amplitudes of FIGS. 2 and 3. The spectral line width of the trace of FIG. 4 is found to be less than 1 angstrom. Thus, the present active medium provides a large output energy in a very narrow emission band. Further, FIG. 2 illustrates the low energy threshold of less than 40 joules required to obtain the stimulated emission of radiation from the present media. It shall be noted that this threshold applies to a laser having no reflecting surfaces.

EXAMPLE 2

A second active medium using a different polar compound and another Lewis acid was prepared and when tested was found to provide stimulated emission having an intensity essentially the same as the medium of Example 1. The preparation was as follows:

750 grams of anhydrous SbCl$_5$ were diluted to 1 liter by the gradual addition of vacuum distilled SeOCl$_2$. The reaction is $$SeOCl_2 + SbCl_5 \rightarrow SeOCl_1^+ + SbCl_6^-$$

Then 75 grams of anhydrous neodymium trichloride, NdCl$_3$, was added to the mixture. The solution was brought to a boil at 170 to 176° C. and vapors were permitted to escape. Then, the solution was cooled to room temperature over night. The concentration of the solution was 0.3 N.

The reaction introducing the active ions into the solution is $$NdCl_3 + 3SeOCl^+ \rightleftharpoons Nd^{3+} + SeOCl_2$$

The preparation took place in a water-free environment.

While the above examples recite SnCl$_4$ and SbCl$_5$ as the Lewis acids, other Lewis acids such as SnBr$_4$, GeCl$_4$ and SO$_3$ may be employed.

The amount of Lewis acid added to the solvent is, in practice, determined primarily by the amount of the polar compound added. In the present active liquid media, laser action has been observed over the 0.02 N to 0.75 N active ion concentration range. The corresponding amounts of Lewis acid ranged from 200 grams to 1600 grams per liter. While the lower limit of active ion concentration required for the generation of stimulated radiation is determined primarily by the losses in the medium and by the level of pumping, a concentration of 0.02 N is found to be the minimum concentration which provides stimulated emission for a 100 joule input pulse of 200$\mu$ second duration. The upper limit of the active ion concentration is dictated by the viscosity of the medium required for a particular application. The viscosity of solutions having a concentration of above 0.75 N at room temperatures is relatively high. In practice, media having higher concentrations are difficult to handle and circulate in a laser structure at room temperature. However, the medium may be used at elevated temperatures and higher concentrations if desired.

Figure 7:
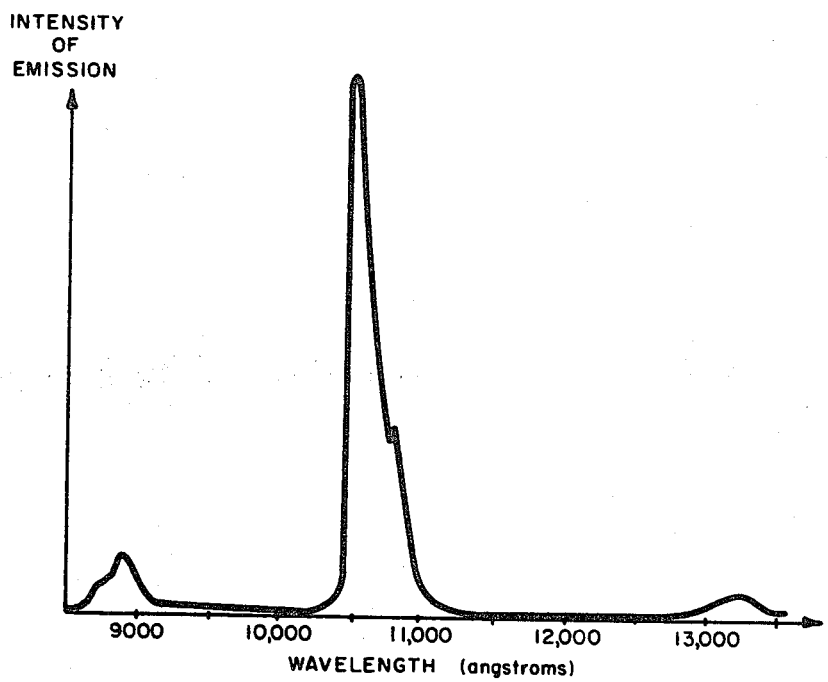

The spectral distribution of absorbance and emission for the neodymium-containing selenium oxychloride active media are shown in FIGS. 5 and 7 respectively. These spectral distributions are found to be essentially independent of the particular polar compound and Lewis acid employed. The absorption bands of the solvated neodymium ion are noted to be broad, typically 100 to 300 angstroms wide. The broad absorption bands increase the efficiency of the conversion of black-body radiation to fluorescent emission. The maxima in the emission spectrum occur at 8905, 10,650 and 13,300 angstroms, corresponding to the $$^4F_{3/2} \rightarrow {}^4I_{9/2}, \quad {}^4F_{3/2} \rightarrow {}^4I_{11/2} \text{ and } {}^4F_{3/2} \rightarrow {}^4I_{13/2}$$

transitions.

The low threshold, high energy output and sharpness of the emission line obtained with the laser of FIG. 1 containing a solution of neodymium in selenium oxychloride as the liquid active medium compare favorably with known single crystal or glass active media. The peak fluorescent emittance from the liquid is a measure of the gain of the laser and exceeds by a factor of 1.2 the emittance of a high quality neodymium-doped, sodium compensated calcium tungstate single laser crystal under identical excitation. In addition, it exceeds by a factor of 4 the emittance of a high quality neodymium-doped barium crown laser glass under identical excitation. This indicates a high quantum efficiency of fluorescence in the present liquid media. It shall be noted from FIG. 7 that the output energy of the neodymium is substantially confined to a narrow emission peak at 10,650 angstroms and, therefore, the emission is relatively intense.

What is claimed is:
1. An active medium consisting essentially of a liquid solution of:
 (a) a compound containing an active ion selected from the group consisting of ions of chromium, manganese, molybdenum, holmium, dysprosium, praseodymium, neodymium, europium, samarium, terbium, erbium, ytterbium, thulium and uranium, the concentration of said ion in solution being within the range 0.02 to 0.75 N;
 (b) a solvent selected from the group consisting of SeOCl$_2$, SeOBr$_2$, SbCl$_3$ and SbBr$_3$; and
 (c) a Lewis acid, said acid being added in an amount that will enhance the solubility of said compound in the solution.

2. The active medium in accordance with claim 1 in which said solvent has a dielectric constant of at least 20.

3. The active medium of claim 1 in which said Lewis acid is selected from the group consisting of $SnCl_4$, $SbCl_5$, $SnBr_4$, $GeCl_4$, and $SO_3$.

4. An active medium consisting essentially of a liquid solution of:
   (a) a polar compound of neodymium, the concentration of neodymium in solution being within the range 0.02 to 0.75 N;
   (b) $SeOCl_2$; and
   (c) a Lewis acid, said acid being added in an amount that will enhance the solubility of said compound in the solution.

5. The active medium of claim 4 in which said polar compound is $Nd_2O_3$ and said Lewis acid is $SnCl_4$.

6. The active medium of claim 4 in which said polar compound is $NdCl_3$ and said Lewis acid is $SbCl_5$.

7. A laser comprising
   (a) a cavity having spaced apart end-seals, at least one of said end-seals being transparent to radiation emitted by said laser, and
   (b) an active medium located within said cavity, said medium consisting essentially of a liquid solution of
      (1) a compound containing an active ion selected from the group consisting of ions of chromium, manganese, molybdenum, holmium, dysprosium, praseodymium, neodymium, europium, samarium, terbium, erbium, ytterbium, thulium and uranium, the concentration of said ion in solution being within the range of 0.02 to 0.75 N;
      (2) a solvent selected from the group consisting of $SeOCl_2$, $SeOBr_2$, $SbCl_3$ and $SbBr_3$; and
      (3) a Lewis acid, said acid being added in an amount that will enhance the solubility of said compound in the solution.

8. The laser of claim 7 in which said active agent is neodymium and said solvent is $SeOCl_2$.

References Cited
UNITED STATES PATENTS 3,404,351  10/1968  Heller _____ 252—301.4
3,417,344  12/1968  Grantham _____ 252—301.4

TOBIAS E. LEVOW, Primary Examiner

R. D. EDMONDS, Assistant Examiner

U.S. Cl. X.R.

252—301.1, 301.4; 330—4.3